(12) United States Patent
Camargo et al.

(10) Patent No.: US 12,181,405 B2
(45) Date of Patent: *Dec. 31, 2024

(54) GAS SENSOR

(71) Applicant: Asahi Kasei Microdevices Corporation, Tokyo (JP)

(72) Inventors: Edson Gomes Camargo, Tokyo (JP); Shota Isshiki, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/495,152

(22) Filed: Oct. 26, 2023

(65) Prior Publication Data

US 2024/0053262 A1 Feb. 15, 2024

Related U.S. Application Data

(63) Continuation of application No. 17/655,789, filed on Mar. 22, 2022, now Pat. No. 11,835,451.

(30) Foreign Application Priority Data

Mar. 25, 2021 (JP) ................................ 2021-052311
Feb. 28, 2022 (JP) ................................ 2022-030424

(51) Int. Cl.
*G01N 21/3504* (2014.01)
*G01N 21/31* (2006.01)
*G01N 21/35* (2014.01)

(52) U.S. Cl.
CPC ....... *G01N 21/3504* (2013.01); *G01N 21/314* (2013.01); *G01N 21/35* (2013.01); *G01N 2201/0627* (2013.01)

(58) Field of Classification Search
CPC .. G01N 21/3504; G01N 21/314; G01N 21/35; G01N 2201/067
See application file for complete search history.

(56) References Cited

U.S. PATENT DOCUMENTS 4,271,124 A 6/1981 Speeter
6,096,560 A 8/2000 Scripca et al.
(Continued)

FOREIGN PATENT DOCUMENTS

CN 85105061 B 2/1987
CN 111929269 A 11/2020
(Continued)

*Primary Examiner* — David P Porta
*Assistant Examiner* — Casey Bryant
(74) *Attorney, Agent, or Firm* — KENJA IP LAW PC

(57) ABSTRACT

A gas sensor comprises first and second light emitting parts, first and second light receiving parts, and first and second optical path regions, wherein the optical path regions have a common region, a first light receiving part has a larger rate of change of an output signal with respect to a first gas than a second light receiving part, the second light receiving part has a larger rate of change of an output signal with respect to an second gas than the first light receiving part, the first light receiving part has a sensitivity peak wavelength closer to a first wavelength in an absorption wavelength band of the first gas than the second light receiving part, and the second light receiving part has a sensitivity peak wavelength closer to a second wavelength in an absorption wavelength band of the second gas than the first light receiving part.

15 Claims, 5 Drawing Sheets

(56) References Cited

U.S. PATENT DOCUMENTS

| | | | |
|---|---|---|---|
| 11,835,451 B2* | 12/2023 | Camargo | G01N 21/314 |
| 2015/0300948 A1 | 10/2015 | Buchtal et al. | |
| 2016/0231244 A1 | 8/2016 | Camargo et al. | |
| 2018/0284014 A1* | 10/2018 | Suehiro | G01N 21/33 |
| 2018/0347797 A1 | 12/2018 | Nicholas et al. | |
| 2020/0386677 A1 | 12/2020 | Deliwala | |

FOREIGN PATENT DOCUMENTS

| | | |
|---|---|---|
| CN | 216926569 U | 7/2022 |
| EP | 1211502 A2 | 6/2002 |
| JP | 2004138499 A | 5/2004 |
| JP | 2004309296 A | 11/2004 |
| JP | 2007292486 A | 11/2007 |
| JP | 2012207968 A | 10/2012 |
| JP | 2014186000 A | 10/2014 |
| JP | 2015512521 A | 4/2015 |
| JP | 2017020901 A | 1/2017 |
| WO | 2015045411 A1 | 4/2015 |
| WO | 2023009605 A1 | 2/2023 |

* cited by examiner

GAS SENSOR

CROSS-REFERENCE TO RELATED APPLICATION

The present application is a continuation application of U.S. patent application Ser. No. 17/655,789 filed Mar. 22, 2022, which claims priority of Japanese Patent Application No. 2021-052311 filed Mar. 25, 2021 and Japanese Patent Application No. 2022-030424 filed Feb. 28, 2022. The disclosures of the prior applications are hereby incorporated by reference herein in their entirety.

TECHNICAL FIELD

The present invention relates to a gas sensor.

BACKGROUND

From the viewpoint of high reliability and long-term measurement reproducibility, the Non Dispersive InfraRed (NDIR) type gas sensor is generally used for a high-precision gas concentration measuring apparatus.

For example, Patent Literature 1 (PTL 1) discloses a gas sensor that uses one light source and two photodetectors.

CITATION LIST

Patent Literature

PTL 1: JP2004138499(A)

SUMMARY

With the existing gas sensor disclosed in PTL 1, it is difficult to measure the gas concentration with high accuracy when there is an absorption wavelength of another gas (hereinafter referred to as an interference gas) near an absorption wavelength of the gas to be measured.

For example, when the gas to be measured is methane gas, the absorption wavelength is from 3.1 to 3.5 µm. Further, the absorption wavelength of water vapor, which is present more than a little in the general environment, is near about from 2.7 to 3.3 µm. Thus, interference between the absorption wavelength of the gas to be measured (methane gas) and that of water vapor occurs, which makes it difficult to measure the concentration of methane gas with high accuracy.

In light of the aforementioned issue, it would be thus helpful to provide a gas sensor capable of measuring gas concentration with high accuracy even if an interference gas is present in addition to the gas to be measured.

A gas sensor according to a first aspect of the present invention includes:
 a first light emitting part and a second light emitting part each outputting infrared light;
 a first light receiving part and a second light receiving part each outputting an output signal in response to each incident infrared light;
 a first optical path region through which light emitted from the first light emitting part passes until it enters the first light receiving part; and
 a second optical path region through which light emitted from the second light emitting part passes until it enters the second light receiving part, wherein
 the first optical path region and the second optical path region have a common region in at least a part of them;
 an optical path length of the first optical path region is longer than an optical path length of the second optical path region;
 a rate of change of an output signal with respect to a change in concentration of a predetermined amount of gas to be measured of the first light receiving part is larger than a rate of change of an output signal with respect to a change in concentration of the predetermined amount of gas to be measured of the second light receiving part;
 a rate of change of an output signal with respect to a change in concentration of a predetermined amount of interference gas of the second light receiving part is larger than a rate of change of an output signal with respect to a change in concentration of a predetermined amount of interference gas of the first light receiving part; and
 a sensitivity peak wavelength of the second light receiving part overlaps with an absorption wavelength of water vapor.

According to the present invention, a gas sensor capable of measuring the gas concentration with high accuracy even when the interference gas is present in addition to the gas to be measured can be provided.

DETAILED DESCRIPTION

Figure 1:
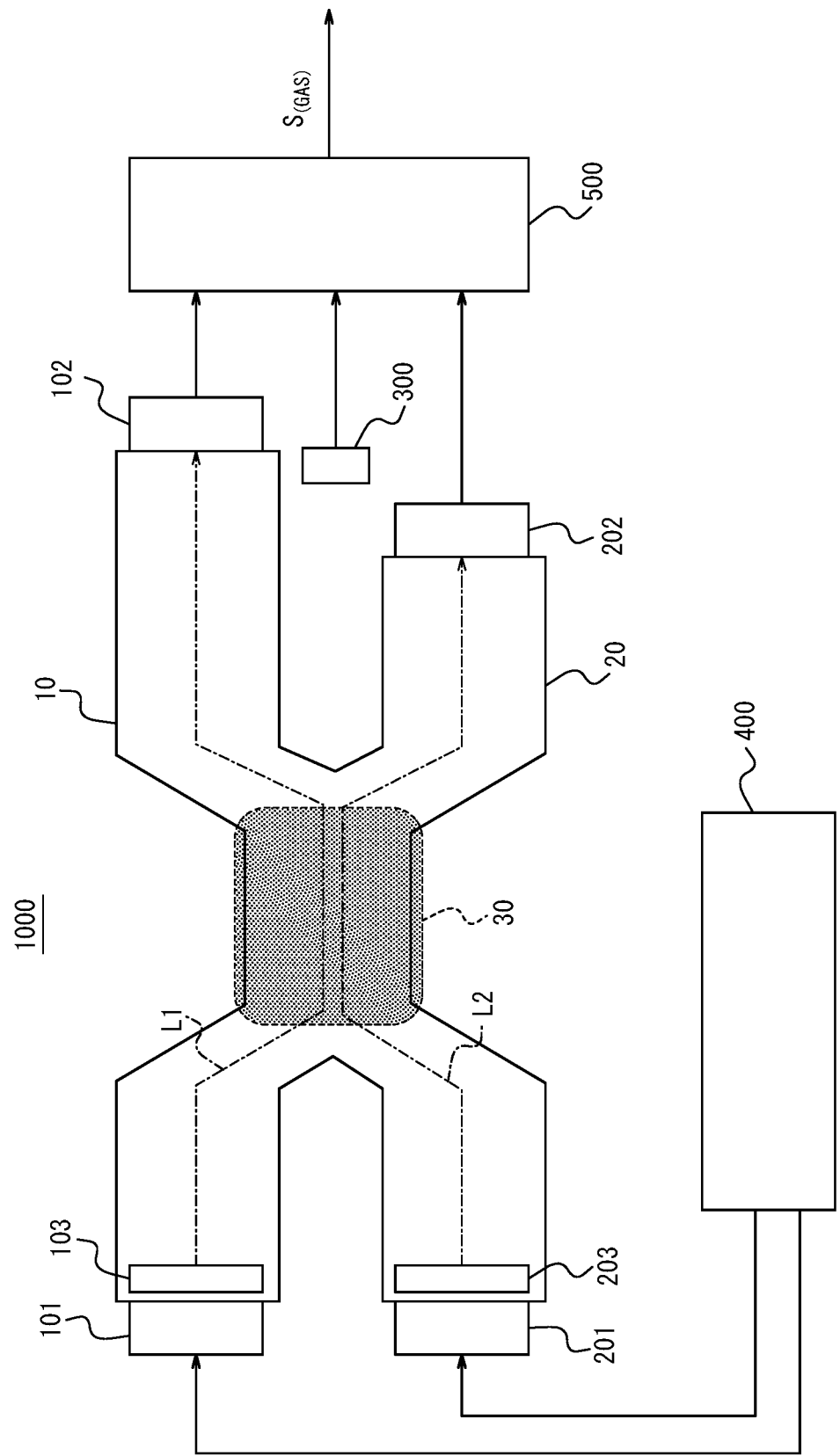
FIG. 1 is a schematic diagram illustrating a gas sensor according to an embodiment of the present invention.

The present invention is described below with an embodiment of the invention, but the following embodiment does not limit the invention as claimed in the claims. Further, not all combinations of characteristics described in the embodiment are essential to the solution of the invention.

<Gas Sensor>

The gas sensor of this embodiment includes a first light emitting part and a second light emitting part each emitting infrared light, a first light receiving part and a second light receiving part each outputting an output signal in response to each incident infrared light, a first optical path region through which a light emitted from the first light emitting part passes until it enters the first light receiving part, and a second optical path region through which a light emitted from the second light emitting part passes until it enters the second light receiving part.

The optical path length of the first optical path region is longer than the optical path length of the second optical path region. Here, the optical path length refers to the length of the path with the highest density of light passing through the optical path region (or the shortest optical distance until the light emitted from the light emitting part reaches the light receiving part).

The rate of change of the output signal with respect to the change in concentration of a predetermined amount of gas to be measured of the first light receiving part is larger than the rate of change of the output signal with respect to the change in concentration of a predetermined amount of gas to be measured of the second light receiving part. Further, the rate of change of the output signal with respect to the change in concentration of a predetermined amount of interference gas of the second light receiving part is larger than the rate of change of the output signal with respect to a predetermined amount of interference gas of the first light receiving part. Further, the sensitivity peak wavelength of the second light receiving part overlaps with the absorption wavelength of water vapor. Here, the sensitivity peak wavelength of the second light receiving part overlaps with the absorption wavelength of water vapor means that the sensitivity peak wavelength of the second light receiving part is included in at least a part of the absorption wavelength of water vapor.

Although the details will be described later, with the above described configuration requirements, the detection performance (e.g., SNR: signal to noise ratio) of the interference gas and the gas to be measured can be optimized to a desired performance, and with the use of output signal of each light receiving part, the influence of the interference gas can be reduced, and as a result, determination of the presence or absence of the gas to be measured and measurement of the concentration with high accuracy can be achieved. Furthermore, when the sensitivity peak wavelength of the second light receiving part overlaps with the absorption wavelength of water vapor, the impact of water vapor, which has a large influence among the interference gases, can be reduced, thus enabling determination of the presence or absence of the gas to be measured and measurement of the concentration with high accuracy.

<Light Receiving Part>

The first light receiving part and the second light receiving part of the gas sensor according to this embodiment each output an output signal in response to the intensity of each incident infrared light. When a gas that absorbs infrared light output from the light emitting part is present in the first optical path region and the second optical path region, the infrared light is attenuated and enters each of the first light receiving part and the second light receiving part. Examples of the light receiving part include a pyroelectric sensor, a thermopile, a phototransistor, a photodiode, and the like. From the viewpoint of achieving high responsiveness, the light receiving part is preferably a quantum infrared sensor represented by a phototransistor and a photodiode, and may be more preferably a photodiode.

It may be preferable that the first light receiving part and the second light receiving part have spectral sensitivity characteristics different from each other so that the magnitude correlation of the rate of change of the output signals of the first light receiving part and the second light receiving part with respect to the change in concentration of the gas to be measured and the interference gas satisfies the above described conditions.

Here, the spectral sensitivity characteristics refer to the sensitivity characteristics to each wavelength of the incident light.

The method of obtaining desired spectral sensitivity characteristics is not particularly limited. However, for example, when the light receiving part is a photodiode, examples include a method of adjusting the material and the composition ratio of the active layer to obtain a desired band gap, a method of providing an optical filter in the optical path region, and the like.

An optical filter can be used so that the magnitude correlation of the rate of change of the output signals of the first light receiving part and the second light receiving part with respect to the change in concentration of the gas to be measured and the interference gas satisfies the above described conditions. When an optical filter is used, the optical filter may be provided either in the first optical path region or the second optical path region, or each of the first optical path region and the second optical path region may be provided with an optical filter having different wavelength transmission characteristics.

Further, as a method of increasing a long term reliability while maintaining the accuracy of the gas sensor, it may be preferable to make the response speed of the first light receiving part different from that of the second light receiving part to achieve lower consumption. In particular, when the gas to be measured is a combustible gas such methane gas and the interference gas is water vapor that generally exists in the environment, the change in concentration of methane gas or combustible gas that do not generally exist in the environment are sudden changes caused by leakage from storage sites, and the like. In contrast, the change in concentration of water vapor that generally exists in the environment is very moderate. Thus, when the response speed of the first light receiving part is different from that of the second light receiving part, low consumption and sufficient accuracy can be ensured, and a long-term reliability can be improved.

When the gas to be measured is a combustible gas such methane gas, it exhibits an absorption wavelength with respect to the infrared light with wavelengths of from 3 to 4 µm and from 7 to 8.5 µm, and in particular, it exhibits a high absorption wavelength with respect to the infrared light of about 3.3 µm. Water vapor, which generally exists in the environment as an interference gas, exhibits an absorption wavelength with respect to the infrared light with a wavelength of from 2 to 3 µm and from 5 to 8 µm, and exhibits a high absorption wavelength with respect to the infrared light with a wavelength of about 2.7 to 3.3 µm.

Therefore, the sensitivity peak wavelength of the second light receiving part may overlap with the absorption wavelength of water vapor, and is preferably from 2 to 3 µm or from 5 to 8 µm. Further, the sensitivity peak wavelength of the second light receiving part is preferably from 2 to 3 µm or from 5 to 7 µm, which does not overlap with the absorption wavelength of combustible gas, so as to be less likely to be affected by the combustible gas. In contrast, the sensitivity peak wavelength of the first light receiving part may overlap with the absorption wavelength of the gas to be measured, which is preferably from 3 to 4 µm or from 7 to 8.5 µm.

Here, when the sensitivity peak wavelength of the first light receiving part is made closer to 3.3 µm than that of the second light receiving part, the rate of change of the output signal of the first light receiving part can be made larger than that of the output signal of the second light receiving part with respect to the change in concentration of a predetermined amount of the gas to be measured.

Further, when the sensitivity peak wavelength of the second light receiving part is made closer to 2.7 µm than that of the first light receiving part, the rate of change of the output signal of the second light receiving part can be made larger than that of the output signal of the first light receiving part with respect to the change in concentration of a predetermined amount of the interference gas.

<Light Emitting Part>

The first light emitting part and the second light emitting part of the gas sensor according to this embodiment are not particularly limited as long as they are light sources that can output infrared light with absorption wavelength of the gas to be measured. Examples include a thermal light source such as a light bulb and a MEMS heater, and a quantum light source such as a laser light source and an LED. An infrared LED may be preferable from the viewpoint of response speed. Further, when the gas to be measured or the interference gas is a combustible gas, a quantum light source with less heat generation and being safer may be preferable.

It may be preferable that the emission spectrum of the first light emitting unit is different from that of the second light emitting unit to ensure that the magnitude relationship of the rate of change of the output signals of the first light receiving part and the second light receiving part with respect to the change in the concentration of the gas to be measured and the interference gas satisfies the above described conditions.

Here, the emission spectrum refers to the distribution of light intensity with respect to each wavelength of the light to be emitted.

In the case of an infrared LED, a desirable emission spectrum (center emission wavelength, wavelength band, etc.) can be obtained by adjusting the material and composition ratio of the light emitting layer, thus may be preferable.

<Optical Path Region>

The optical path region in the present invention refers to a space from the light emitting part to the light receiving part. That is, the first optical path region refers to a space through which the light emitted from first light emitting part passes until it enters the first light receiving part. Further, the second optical path region refers to a space through which the light emitted from the second light emitting part passes until it enters the second light receiving part. The first optical path region and the second optical path region may be collectively referred to as an "optical path region."

When the gas to be measured and the interference gas invade this optical path region, the light absorption is caused by the gas to be measured and the interference gas, and the amount of light received by the light receiving part changes, then output signals corresponding to the concentration of the gas to be measured and the interfering gas can be obtained. In FIG. 1, a light ray L1 (which is a path of light and may be referred to as a "first optical path") emitted from a first light emitting part 101 is schematically illustrated by a single dashed line. Further, in FIG. 1, a light ray L2 (which is a path of light and may be referred to as a "second optical path") emitted from a second light emitting part 201 is schematically illustrated by another single dashed line.

Figure 2:
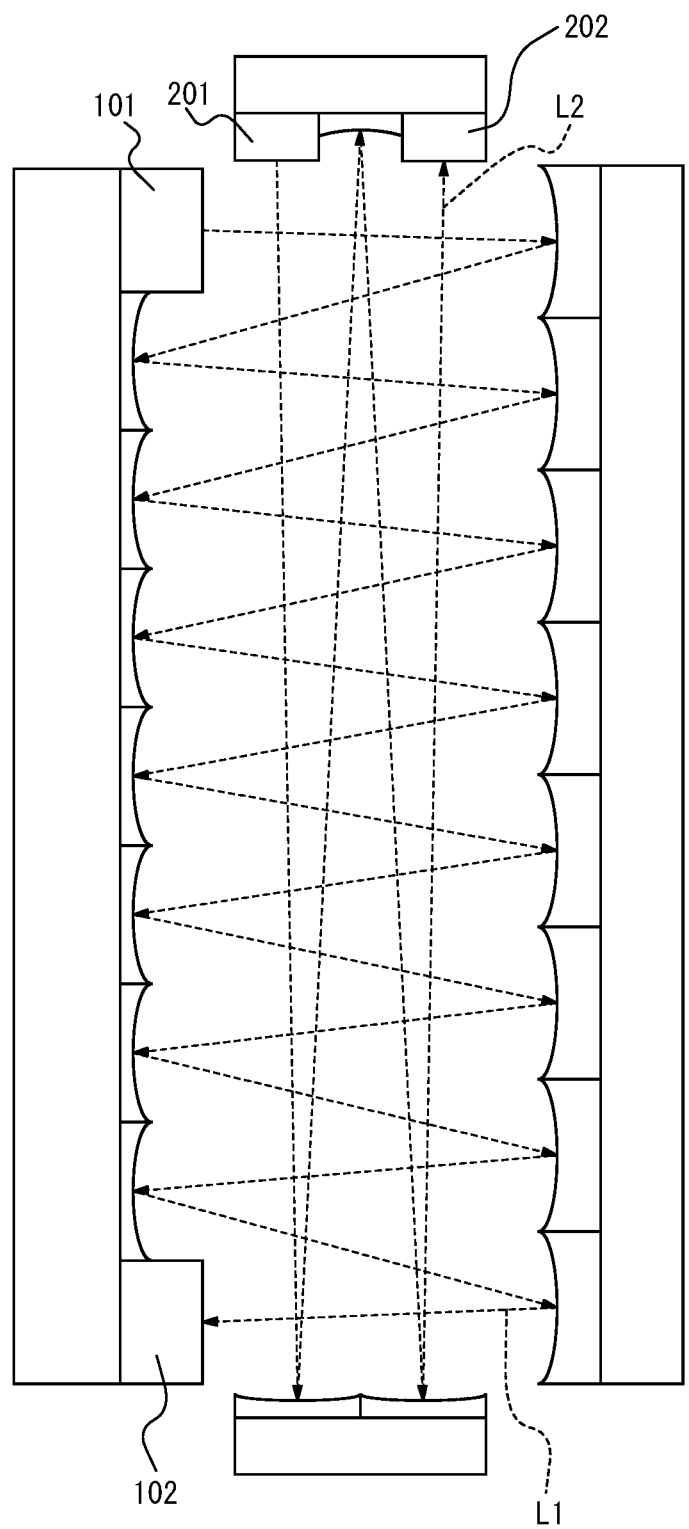
FIG. 2 is a diagram illustrating the gas sensor according to an embodiment of the present invention.

Further, as illustrated in FIG. 2, the first optical path and the second optical path may intersect with each other. From the viewpoint of space saving, there are some cases where intersection of the first optical path and the second optical path is preferable.

Furthermore, intersecting the first optical path and the second optical path may be preferable since it has less impact on the measurement results due to the difference in concentration distribution of the gas to be measured and the interference gas in the optical path space, compared with the case where the first optical path and the second optical path are separated from each other.

Typically, the optical path region is formed by placing a member (also referred to as a mirror) having a high reflectance so that the light emitted from the light emitting part reaches the light receiving part. Alternatively, the optical path region may be formed by placing the light emitting surface of the light emitting part and the light receiving surface of the light receiving part so that they face each other.

<Example of a Specific Configuration of the Gas Sensor According to this Embodiment>

FIG. 1 is a schematic diagram of a gas sensor 1000 according to an embodiment of the present invention.

The gas sensor illustrated in FIG. 1 includes a first light emitting part 101 and a second light emitting part 201 each emitting infrared light, a first light receiving part 102 and a second light receiving part 202 each outputting an output signal in response to incident infrared light, a first optical path region 10 through which the light emitted from the first light emitting part 101 passes until it enters the first light receiving part 102, and a second optical path region 20 through which the light emitted from the second light emitting part 201 passes until it enters the second light receiving part 202.

The first optical path region 10 and the second optical path region 20 have a common region 30 where a part of one of them is spatially common with a part of the other.

The first light receiving part 102 and the second light receiving part 202 are designed so that a rate of change of output signal with respect to the change in concentration of a predetermined amount of gas to be measured of the first light receiving part is larger than the rate of change of output signal with respect to the change in concentration of a predetermined amount of gas to be measured of the second light receiving part, and the rate of change of output signal with respect to the change in concentration of a predetermined amount of interference gas of the second light receiving part is larger than the rate of change of output signal with respect to the change in concentration of a predetermined amount of interference gas of the first light receiving part.

Further, the optical path length of the first optical path region (the optical path length for the light emitted from the first light emitting part 101 until it enters the first light receiving part 102, indicated by the light ray L1) is longer than the optical path length of the second optical path region (the optical path length for the light emitted from the second light emitting part 201 until it enters the second light receiving part 202, indicated by the light ray L2).

The light emission driving part 400 is provided to drive the first light emitting part 101 and the second light emitting part 201. The light emission driving part 400 may supply constant current pulses or constant voltage pulses to the first light emitting part 101 and the second light emitting part 201.

Further, a concentration operation part 500 may calculate the concentration of the gas to be measured by using the output signal from the first light receiving part 102 and the second light receiving part 202 and the output signal from a temperature sensor 300. From the viewpoint of high accuracy measurement, it may be preferable to perform temperature compensation using the output from the temperature sensor.

Further, the output signals of the first light receiving part 102 and the second light receiving part 202 may be detected by synchronizing the light emission driving part 400 and the concentration operation part 500. The frequency at which light is emitted from the first light emitting part 101 and signals are detected by the first light receiving part 102 is made different from the frequency at which light is emitted from the second light emitting part 201 and signals are detected by the second light receiving part 202 so as not to emit light and detect signals simultaneously. Alternatively, even if the same frequency is used, when the timings at which signals are emitted from each light emitting part and detected by each light receiving part are shifted, strokes of both light receiving parts can be removed. This removal of strokes may be preferable because it can be efficiently performed by using quantum type light emitting part and light receiving part. Further, when the light emitting part is a thermal light source and the light receiving part is affected by the thermal radiation from the light source, the impact of thermal radiation on the light receiving part at the timing of signal detection can be detected individually. Thus, the impact of this thermal radiation is accurately detected, and suppression of the impact by signal processing can be achieved.

Further, the first optical filter 103 and the second optical filter 203 may be bandpass filters that transmit light in the absorption wavelength band of the interference gas and the gas to be measured, respectively.

The first optical path region and the second optical path region may be configured as illustrated in FIG. 2 to save space and to be longer. Further, as illustrated in FIG. 2, it may be preferable that the first optical path region and the second optical path region are provided with a common region, because it suppresses an effect of difference in the concentration distribution of the gas to be measured and the interference gas in the first optical path and the second optical path, and an effect of the interference gas can be removed with high accuracy.

Further, the light emission driving part 400 and the concentration operation part 500 may be provided in the optical path region. This allows for further miniaturization.

Examples

As illustrated in FIG. 2, a gas sensor was produced by placing a first light emitting part, a first light receiving part, a second light emitting part, a second light receiving part and a plurality of mirrors to form a first optical path region and a second region so that the light ray from the first light emitting part and the light ray from the second light emitting part were substantially orthogonal to each other.

<First Light Emitting Part, First Light Receiving Part and First Optical Path Region>

The first light emitting part and the first light receiving part are an LED and a photodiode composed by a p-layer/active layer/n-layer multilayered structure formed on GaAs substrate and having a chip size of 0.7×0.7 μm². AlInSb layer with a thickness of 1.34 μm was used as the active layer, and the Al composition was 8.9%.

The LED was divided into 7 stages and the photodiode was divided into 73 stages by etching process, and finally, a metal wiring layer was provided for electrical series connection.

The light entrance and exit ports were provided on a side of GaAs substrate where the stacked structure was not formed, and were sealed with SMT (Surface-mount Technology) resin. Further, an optical filter with a central transmission wavelength of 3.3 μm was provided on the top of the photodiode package, and a Printed Circuit Board (PCB) was used to connect the LED and photodiode to the circuit. In order to realize a high SNR, a signal processing circuit was provided near the photodiode.

Further, the light ray from the first light emitting part (LED) is multiply reflected by 17 concave mirrors whose reflective surface is an aluminum thin film, and reaches the first light receiving part (photodiode). The optical path length was 1 m, and was designed so that 15% or more of the light emitted from the light emitting part reached the light receiving part.

The LED was intermittently driven with a current value of 100 mA, and a resolution of about several ppm in terms of methane concentration could be realized.

<Second Light Emitting Part, Second Light Receiving Part and Second Optical Path Region>

The second light emitting part, the second light receiving part and the second optical path region were configured to have the following differences from the first light emitting part, the first light receiving part and the first optical path region.

Thickness of the active layer: 1 μm
Al composition of the active layer: 14%
Photodiode stages: 41 stages
LED stages: 6 stages
Center wavelength of optical filter: 2.7 μm
Concave mirrors: 5 pieces
Optical path length: 80 mm The LED was intermittently driven with a current value of 100 mA, and a resolution of about 500 ppm in terms of water vapor concentration could be realized.

<Correction for Removing Water Vapor Effect>

Assuming that the correlation function between the output S2 from the second light receiving part and the output S1 from the first light receiving part obtained above is f, the following equation (1) is obtained under the condition that the methane concentration is 0 ppm.

$$S1 = f(S2)|_{0ppm} \quad (1)$$

The output variation rate $S1_{adj}$, which is obtained by correcting the effect of water vapor and extracting only the signal change due to methane from the first light receiving part, can be calculated as shown in Equation (2).

$$S1_{adj} = (S1 - f(S2)|_{0ppm}) / f(S2)|_{0ppm} \quad (2)$$

Here, "$|_{0ppm}$" in the equations (1) and (2) indicates that the gas to be measured (methane gas) is the correlation function f obtained under the condition of 0 ppm.

In the equation (2), when methane is 0 ppm, the output variation rate $S1_{adj}$ is 0 ppm even if the concentration of water vapor is 0 ppm or more. In other words, when the concentration of methane does not change even if the concentration of water vapor changes, the output variation rate $S1_{adj}$ does not change. In equation (2), the output variation rate $S1_{adj}$ changes in response to fluctuation of the concentration of methane only when the concentration of methane fluctuates.

Figure 3:
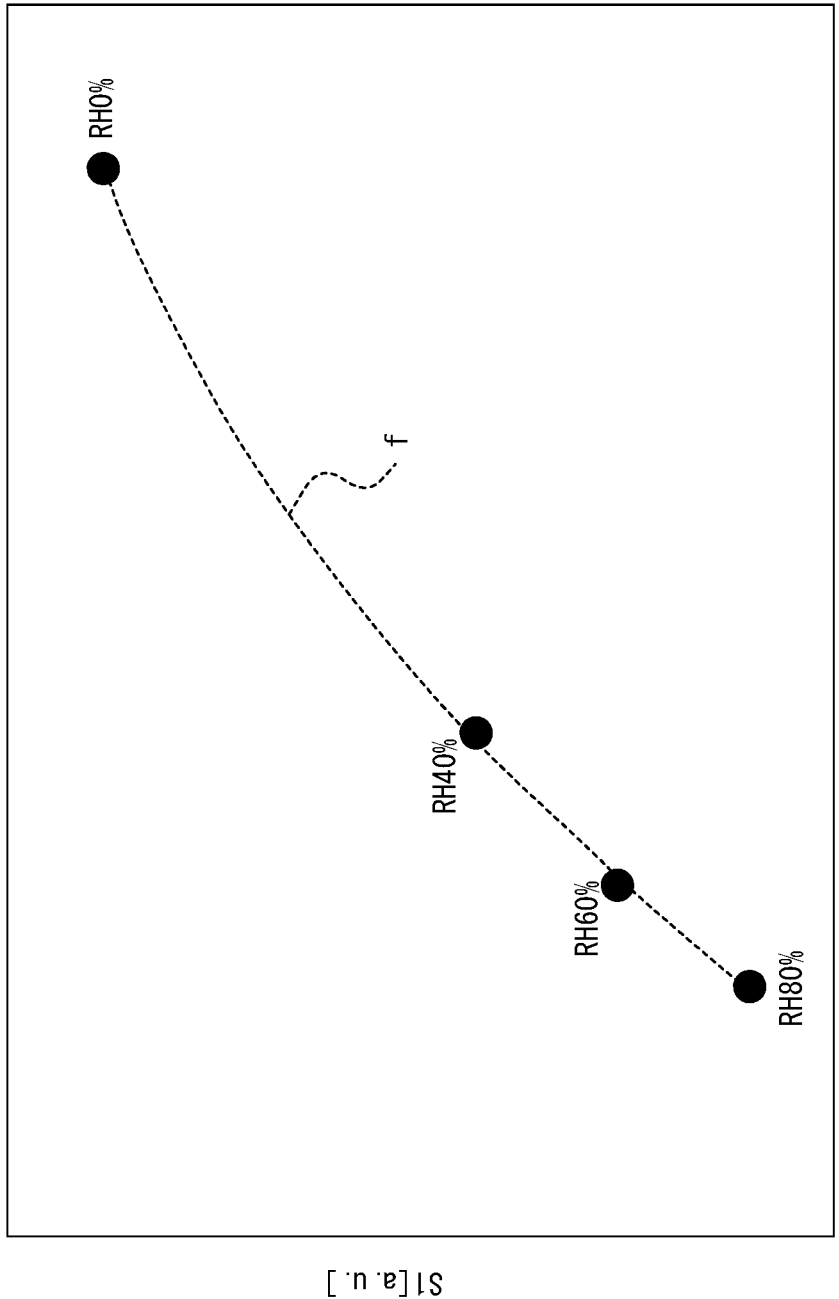
FIG. 3 is a graph illustrating a correlation between the output signal level of the first light receiving part and the output signal level of the second light receiving part at each relative humidity with the operating environment temperature of 60° C. and the methane gas concentration of 0 ppm.

FIG. 3 shows measurement results used for deriving the correlation function f (S2) in the above equation (1) in this embodiment. The measurement results of the output S1 from the first light receiving part and the output S2 from the second light receiving part when the relative humidity was changed to 0%, 40%, 60%, and 80% under the 0 ppm methane concentration and environment of 60° C. were plotted to derive the correlation function f (S2). Further, to derive the correlation function f (S2), the temperature information of the temperature sensor is used for the output S1 from the first light receiving part and the output S2 from the second light receiving part, and the values after temperature correction may be used. In this manner, a correlation function f (S2) also having a temperature correction function can be derived.

Figure 4:
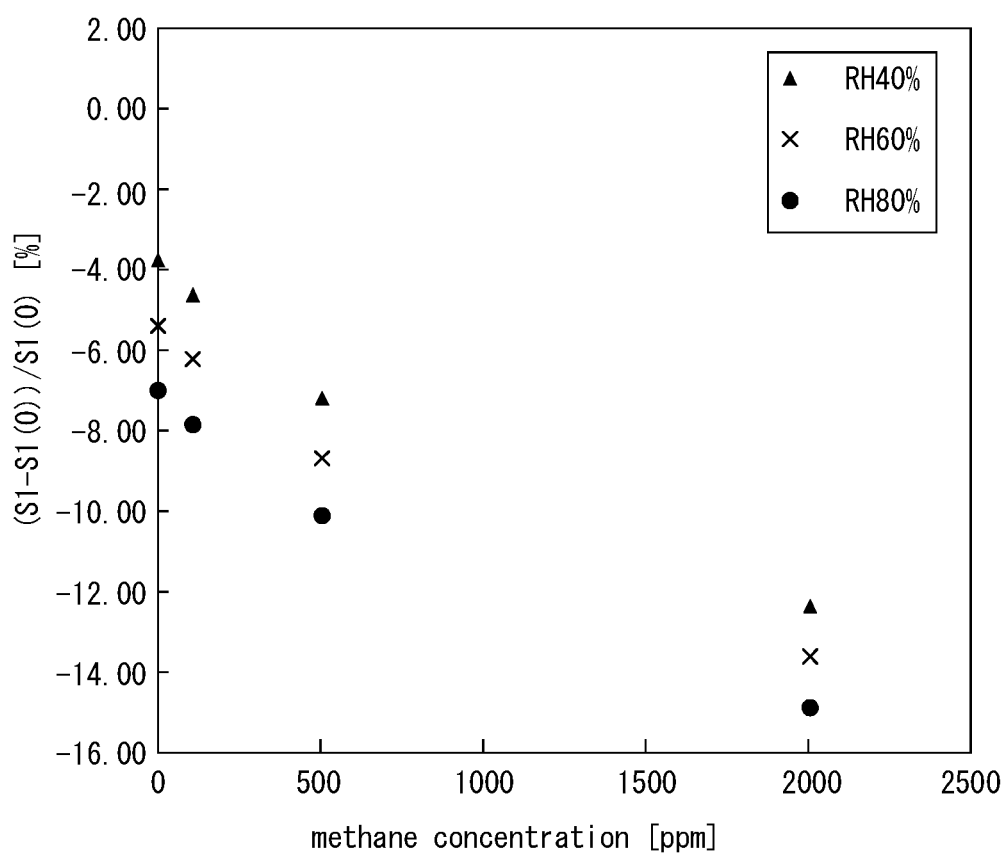
FIG. 4 is a graph illustrating the output fluctuation values when humidity correction by the signal of the second light receiving part is not applied.

FIG. 4 illustrates the variation rate of the output "(S1−S1(0))/S1(0)" from the first light receiving part corresponding to the change in concentration of methane under the respective environments of relative humidity RH 40%, 60% and 80% at a water vapor temperature of 60° C. without water vapor correction (using only the output S1 from the first light receiving part). For the output variation rate, the signal attenuation "S1−S1 (0)" is represented by the output variation rate "(S1−S1 (0))/S1 (0)," on the basis of the output signal "S1 (0)" from the first light receiving part, when methane and water vapor concentrations are 0 ppm. As is clear from FIG. 4, when the relative humidity changes, the output signal is different even if the methane concentration is the same, and thus the methane concentration cannot be specified from the output signal with high accuracy.

Figure 5:
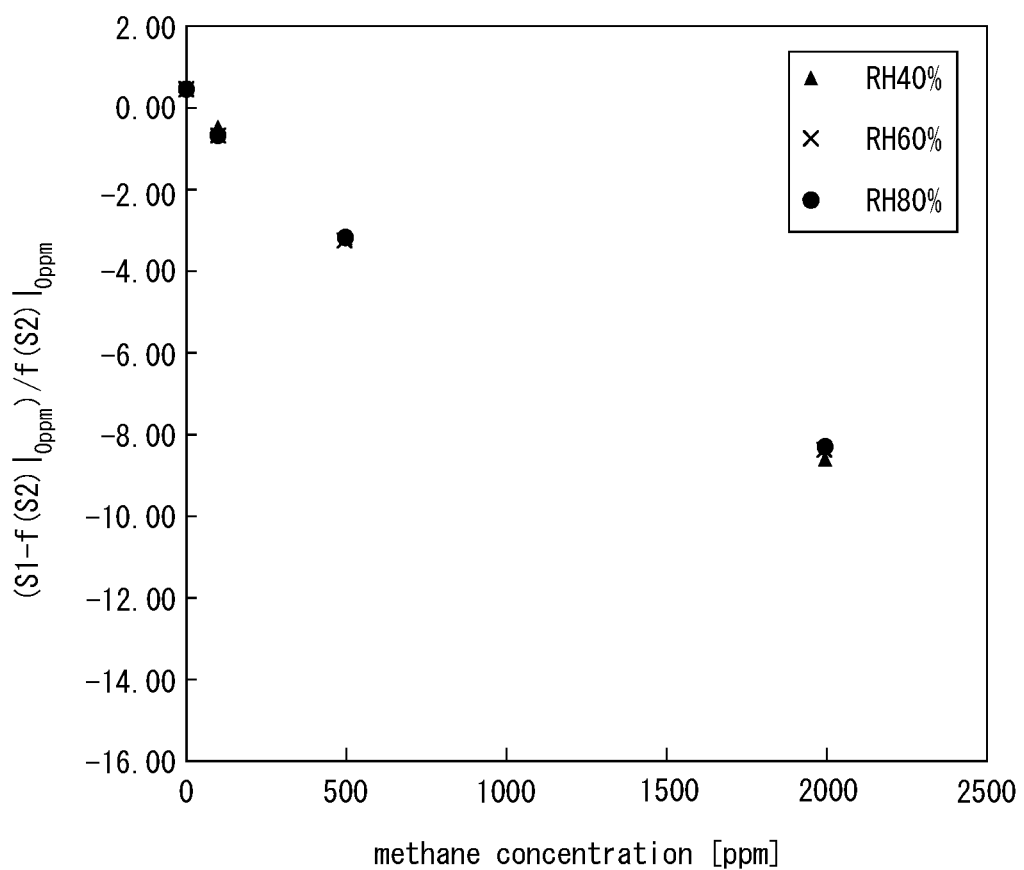
FIG. 5 is a graph illustrating the output fluctuation values when humidity correction by the signal of the second light receiving part is applied.

In contrast, FIG. 5 shows the output variation rate $S1_{adj}$, which is obtained by correcting the effect of water vapor from the functions shown in the above equations (1) and (2) and extracting only signal changes due to methane, using the output S2 from the second light receiving part in addition to the output signal from the first light receiving part.

As illustrated in FIG. 5, even if the relative humidity RH changes, the output signal variation rates corrected by each methane concentration are substantially match. From this, it can be understood that the methane concentration can be specified with high accuracy from the corrected output signal.

Here, the concentration of the gas to be measured can be calculated by applying the concentration calculation table or the fitting of exponential function to the output variation rate $S1_{adj}$. For example, assuming that a function showing a correlation with the output variation rate $S1_{adj}$ when the concentration C of the gas to be measured is changed under a constant water vapor concentration is g, the concentration C of the gas to be measured is obtained by the following equation (3).

$$C = g(S1_{adj}) \quad (3)$$

Here, the equations (2) and (3) used to calculate the concentration of the gas to be measured are preferably polynomials.

Although the present invention has been described using the embodiment, the technical scope of the present invention is not limited to the scope described in the embodiment. It is obvious for a person skilled in the art that various modifications and variations can be added to the above described embodiment. It is clear from the description of the claims that the embodiment with such modifications or variations may be included in the technical scope of the present invention.

In particular, in the present embodiment, removing the effect of humidity (water vapor) has mainly been described. However, it is also possible to remove the influence of other factors causing accuracy errors. As an example, an effect of the temperature characteristics (change in the output due to the temperature during measurement) can be removed.

The invention claimed is:

1. A gas sensor comprising:
a first light emitting part and a second light emitting part each emitting an infrared light;
a first light receiving part and a second light receiving part each outputting an output signal in response to an incident infrared light;
a first optical path region through which a light emitted from the first light emitting part passes until it enters the first light receiving part; and
a second optical path region through which a light emitted from the second light emitting part passes until it enters the second light receiving part, wherein the first optical path region and the second optical path region have a common region in at least a part thereof;
a rate of change of an output signal with respect to a change in concentration of a predetermined amount of first gas of the first light receiving part is larger than a rate of change of an output signal with respect to a change in concentration of the predetermined amount of first gas of the second light receiving part;
a rate of change of an output signal with respect to a change in concentration of a predetermined amount of second gas of the second light receiving part is larger than a rate of change of an output signal with respect to a change in concentration of the predetermined amount of second gas of the first light receiving part;
the first light receiving part has a first sensitivity peak wavelength;
the second light receiving part has a second sensitivity peak wavelength;
the first sensitivity peak wavelength is closer to a first wavelength in an absorption wavelength band of the first gas than the second sensitivity peak wavelength; and
the second sensitivity peak wavelength is closer to a second wavelength in an absorption wavelength band of the second gas than the first sensitivity peak wavelength.

2. The gas sensor according to claim 1, wherein spectral sensitivity characteristics of the first light receiving part are different from those of the second light receiving part.

3. The gas sensor according to claim 1, wherein a response speed of the first light receiving part is different from that of the second light receiving part.

4. The gas sensor according to claim 1, wherein the first light receiving part and the second light receiving part are quantum infrared light sensors.

5. The gas sensor according to claim 1, further comprising an optical filter in either the first optical path region or the second optical path region.

6. The gas sensor according to claim 1, further comprising optical filters with different wavelength transmission characteristics in each of the first optical path region and the second optical path region.

7. The gas sensor according to claim 1, wherein an emission spectrum of the first light emitting part is different from that of the second light emitting part.

8. The gas sensor according to claim 1, wherein the first light emitting part and the second light emitting part are infrared light LEDs.

9. The gas sensor according to claim 1, wherein the second sensitivity peak wavelength of the second light receiving part overlaps with from 2 to 3 μm or from 5 to 8 μm.

10. The gas sensor according to claim 1, wherein the first sensitivity peak wavelength of the first light receiving part is closer to 3.3 μm than the second sensitivity peak wavelength of the second light receiving part.

11. The gas sensor according to claim 1, wherein the second sensitivity peak wavelength of the second light receiving part is closer to 2.7 μm than the first sensitivity peak wavelength of the first light receiving part.

12. The gas sensor according to claim 1, wherein an equation in which an effect of the second gas is removed from an output signal of the first light receiving part and an output signal of the second light receiving part is calculated, and concentration of the first gas is calculated by using the equation.

13. The gas sensor according to claim 12, wherein the equation is a polynomial.

14. The gas sensor according to claim 1, wherein the first light receiving part outputs an output signal that changes in response to a change in concentration of one of the first gas and the second gas; and the second light receiving part outputs an output signal that changes in response to a change in concentration of the second gas.

15. The gas sensor according to claim 1, wherein an optical path length of the first optical path region is longer than an optical path length of the second optical path region.

* * * * *